United States Patent
Feng et al.

(10) Patent No.: US 7,916,598 B2
(45) Date of Patent: Mar. 29, 2011

(54) METHOD FOR DETERMINING TYPE OF DISK AND APPARATUS THEREOF

(75) Inventors: Wen-Chun Feng, Taipei (TW); Yen-Chien Cheng, Taipei County (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 65 days.

(21) Appl. No.: 12/534,866

(22) Filed: Aug. 4, 2009

(65) Prior Publication Data

US 2010/0271918 A1      Oct. 28, 2010

(30) Foreign Application Priority Data

Apr. 24, 2009   (TW) ................................ 98113687 A (51) Int. Cl.
*G11B 7/00*          (2006.01)

(52) U.S. Cl. .................................. 369/53.23; 369/53.2

(58) Field of Classification Search ............... 369/53.23, 369/53.2
See application file for complete search history.

(56) References Cited

U.S. PATENT DOCUMENTS

7,760,603 B2 *   7/2010  Jeong .......................... 369/53.23
2005/0265189 A1 *  12/2005  Tai .............................. 369/53.2
* cited by examiner

*Primary Examiner* — Aristotelis Psitos
(74) *Attorney, Agent, or Firm* — Jianq Chyun IP Office (57) ABSTRACT

A method for determining a type of a disk and an optical storage apparatus thereof are provided. The method includes when the disk placed in the optical storage device is not a blank disk, determining whether the phases between a first signal and a second signal of the disk are the same or not; and determining that the disk is a low to high (LTH) data disk or a high to low data disk (HTL) data disk upon whether the phases of the first signal and the second signal are the same or not. Therefore, the reading parameters are correspondingly loaded in the optical storage device according to the type of the disk.

21 Claims, 8 Drawing Sheets

METHOD FOR DETERMINING TYPE OF DISK AND APPARATUS THEREOF

CROSS-REFERENCE TO RELATED APPLICATION

This application claims the priority benefit of Taiwan application serial no. 98113687, filed Apr. 24, 2009. The entirety of the above-mentioned patent application is hereby incorporated by reference herein and made a part of specification.

BACKGROUND OF THE INVENTION

1. Field of the Invention

The present invention generally relates to a method for determining the type of a disk, and more particularly, to a method for determining the type of a blu-ray disk and an optical storage apparatus thereof.

2. Description of Related Art

With the rapid development of blu-ray storage technology, the price of a blu-ray disk (BD) is gradually reduced. However, it is still more expensive than a digital versatile disc (DVD), which is currently the mainstream in the market. For this reason, a new method called "Low to High (LTH)" related to a format standard, BD-R Format V1.2, for blu-ray has been developed, and it's helpful to reduce the cost of the BD.

The disks use the LTH method are coated with organic compounds, i.e. organic dyes, as a data layer. The LTH method is related to a method for recording data, in which the reflectivity of regions of writing data changes from low to high. Accordingly, a disk, which data is written with the LTH technology, is an LTH disk.

Figure 1:
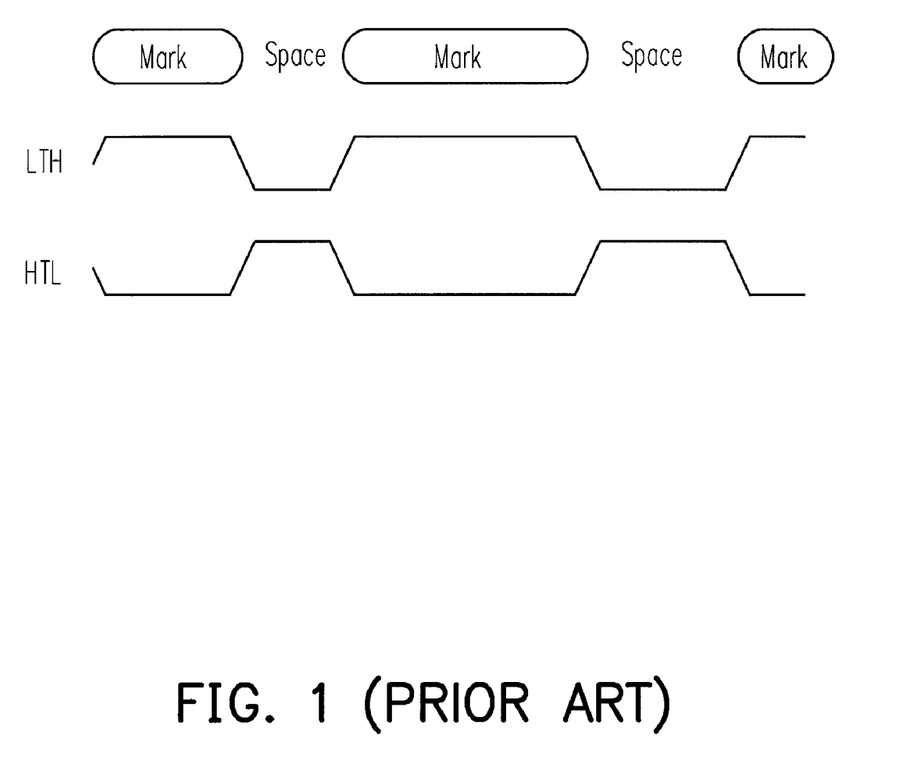
FIG. 1 is a diagram of a blu-ray disk.

FIG. 1 is a diagram of a blu-ray disk. Referring to FIG. 1, regions for writing data are called "MARK", and regions not for writing data are called "SPACE". In the LTH disk, after the data is written, the reflectivity of the MARK regions is raised and is much higher than the reflectivity of the SPACE regions not for writing data. Since the reflectivity of the MARK regions is raised from low to high, the disk is the LTH disk.

The conventional blu-ray disks are coated with metal compounds, i.e. inorganic dyes, as the data layer. Accordingly, a disk, which data is written with the HTL method, is an HTL disk. In the HTL disk, after the data is written, the reflectivity of the regions for writing data changes from high to low. That is, the reflectivity of the MARK regions changes from high to low. At present, the blue-ray re-writeable disks (BD-RWs) are generally HTL type. Accordingly, when the LTH disk is read by a reading/writing system of an optical disk drive, the optical disk drive has to load a specific judging mechanism with a suitable setting and a specific servo operation.

Since the reflectivities of the regions for writing data are much different between the LTH disk and the HTL disk, the optical disk drive must have to first determine the type of the disk in order to correctly play and record the disk. Next, according to the type of the disk, parameters for servo signals, such as a tracking error (TE) signal and a focus error (FE) signal, are optimal set. In order to ensure the quality of the signals on disk, the parameters, such as gains, for the above-described servo signals have to be regulated due to the type of the disk. Furthermore, since the reflectivities are different due to the types of the disks, intensity of radio frequency (RF) signals, i.e. data signals, are also different. As a result, the parameters for an RF equalizer (RF EQ) and the laser power for the optical pick-up head have to be modified according to the types of the disks.

SUMMARY OF THE INVENTION

It is important to note that positions for writing data are different about these two kinds of the disks. The method for writing data in the LTH disk is IN GROOVE, and the method for writing data in the HTL disk is ON GROOVE. Since a differential push pull (DPP) signal is used for tracking in the optical click drive, the tracked positions are different in the LTH disk and the HTL disk. Accordingly, the disk may not be read and recorded under the type of the disk is not predetermined to change the positions tracked by the optical disk drive.

Accordingly, it is provided in embodiments consistent with the present invention that the disk is predetermined as the LTH disk or the HTL disk before being tracked whether the disk is blank or written with data. Since the suitable parameters are set, the tracked positions in the disk are exact. Accordingly, the tracking error or the time for try and error are avoided.

The present invention is directed to a method for determining a type of an optical disk that the disk is an LTH disk or a HTL disk.

The present invention is also directed to an optical storage apparatus capable of loading in different parameters according to the disk type to generate the corresponding servo signal.

According to an embodiment, the present invention provides a method for determining a type of a disk in an optical storage apparatus including the following steps. When the disk read by the optical storage apparatus is determined not blank, the phases of the first signal and the second signal of the disk are detected. Next, it is determined that the disk is the LTH data disk or the HTL data disk upon whether the phases of the first signal and the second signal are the same or not.

In an embodiment of the present invention, the method further includes when the disk is blank, it is detected an amplitude of a third signal and/or a fourth signal of the disk, and the type of the disk is determined upon whether the amplitude of the third signal or the amplitude of the fourth signal is larger than a predetermined threshold or not. When the amplitude of the third signal or the amplitude of the fourth signal is smaller than or equal to the predetermined threshold, the disk is the HTL blank disk, and when the amplitude of the third signal or the amplitude of the fourth signal is larger than the predetermined threshold, the disk is the LTH blank disk.

In an embodiment of the present invention, the first signal is a differential phase detection (DPD) signal, and the second signal is a main push-pull (MPP) signal, a sub-push-pull (SPP) signal, a differential push-pull (DPP), or a combination thereof.

In an embodiment of the present invention, the third signal is a radio frequency (RF) signal, and the fourth signal is a radio frequency ripple (RFRP) signal.

In an embodiment of the present invention, the above-mentioned step of determining the type of the disk upon whether the phases of the first signal and the second signal are the same or not includes the following steps. When the phases of the first signal and the second signal are the same, the disk is the HTL data disk. When the phases of the first signal and the second signal are opposite, the disk is the LTH data disk.

In an embodiment of the present invention, the above-mentioned step of determining the type of the disk upon whether the phases of the first signal and the second signal are the same or not includes the following steps. When the phases of the first signal and the second signal are opposite, the disk is the HTL data disk. When the phases of the first signal and the second signal are the same, the disk is the LTH data disk.

According to an embodiment, the present invention also provides an optical storage apparatus for determining a type of a disk and including an optical pick-up head, a digital signal processor, and a control unit. The optical pick-up head is used to read the disk and outputs a plurality of electrical signals according to the result of reading the disk, wherein the electrical signals includes an RF signal. The digital signal processor is coupled to the optical pick-up head and used to process an operation according to the electrical signals to obtain a first signal, a second signal, and a RFRP signal. When the disk is not a blank disk, the digital signal processor determines whether the phases of the first signal and the second signal are the same or not. The control unit is coupled to the digital signal processor. When the disk is not a blank disk, the control unit determines that the disk is the LTH data disk or the HTL data disk upon whether the phases of the first signal and the second signal are the same or not, and loads in a plurality of corresponding parameters according to the above-described determining result, so as to generate a corresponding servo signal.

In an embodiment of the present invention, the control unit determines that the disk is the LTH blank disk or the HTL blank disk upon whether the amplitude of the RF signal and/or the amplitude the RFRP signal are/is greater than the predetermined threshold or not.

In an embodiment of the present invention, the above-described disk is a blu-ray disk.

From the above, the optical storage apparatus and the method for determining a type of a disk thereof in one embodiment of the present invention are capable of determining that the read disk is the LTH disk or the HTL disk. The optical storage apparatus can load different parameters upon whether the disk is the LTH disk or the HTL disk to generate the corresponding servo signal. Accordingly, the optical storage apparatus can correctly track on the disk, which preventing the disk being played or recorded incorrectly due to wrong parameters loaded in the optical storage apparatus.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Since written positions and reflectivities of the LTH writeable disk and the HTL writeable disk are different, it has to be determined that the blu-ray disk (BD) is the LTH disk or the HTL disk when the BD is read or written. The BD may be a blu-ray recordable disk (BD-R) or a blu-ray re-writeable disk (BD-RW).

Figure 2A:
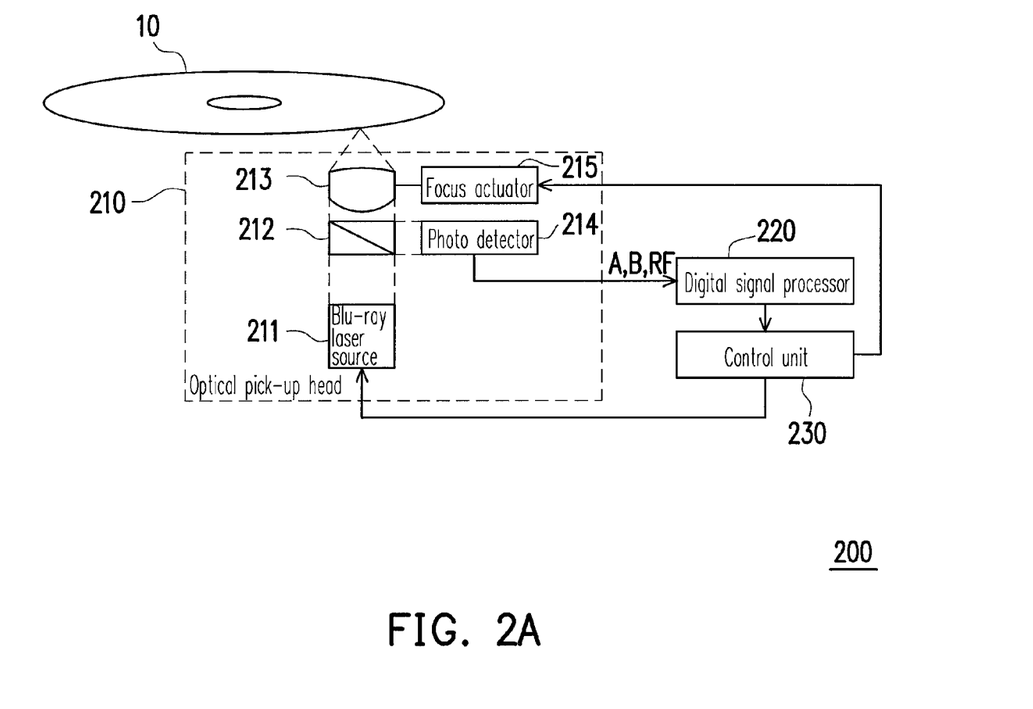
FIG. 2A is a schematic diagram showing a system of an optical storage apparatus according to an embodiment of the present invention.

FIG. 2A is a schematic diagram showing a system of an optical storage apparatus according to an embodiment of the present invention. Referring to FIG. 2A, in the present embodiment, an apparatus determining the type of the disk, for example, is an optical storage apparatus 200. The optical storage apparatus 200 includes an optical pick-up head 210, a digital signal processor 220, and a control unit 230. The optical pick-up head 210 receives a servo signal from the control unit 230 to focus and track on a disk 10, so as to read the disk 10 and thus generating a plurality of electrical signals, wherein the disk 10 may be the BD, and the electrical signals include a radio frequency (RF) signal. The digital signal processor 220 calculates a differential phase detection (DPD) signal, a differential push-pull (DPP) signal, and a radio frequency ripple (RFRP) signal according to the electrical signals A, B, C, and D and the RF signal provided by the optical pick-up head 210. When the disk is a data disk, the digital signal processor 220 compares a phase difference between the DPD signal and the DPP signal after the digital signal processor 220 is obtained the DPD signal. When the disk is a blank disk, since the blank disk without data, the DPD signal is not generated. Accordingly, when the disk is the blank disk, the digital signal processor 220 detects whether the amplitude of the RF signal and/or the amplitude of the RFRP signal are/is greater than a predetermined threshold to determine the type of the disk upon the detecting result. Moreover, the digital signal processor 220 outputs the above-described comparing result or the detected amplitudes. The control unit 230 generates the servo signal to control the optical pick-up head 210 to read and write the disk 10 according to the output signals from the digital signal processor 220 and a plurality of parameters, such as track signal and focus signal.

Referring to the optical pick-up head 210, the optical pick-up head 210 includes a blu-ray laser source 211, a splitter 212, an objective lens 213, a photo detector 214, and a focus actuator 215. In the optical pick-up head 210, the blu-ray laser source 211 receives the servo signal from the control unit 230 for determining whether to emit a light beam and regulate light power or not. The light beam emitted from the blu-ray laser source 211 are transmitted to the objective lens 213 through the splitter 212. After passing through the objective lens 213, the light beam is focused on the data layer of the disk 10. The light beam focused on the data layer of the disk 10 is reflected, so that a light beam signal is generated. The light beam signal is transmitted to the photo detector 214 through the splitter 212. The photo detector 214 converts the light beam signal to the electrical signals A, B, C, and D and the RF signal. The focus actuator 215 also receives the servo signal from the control unit 230 to adjust the position of the objective lens 213. Accordingly, the light beam emitted from the blu-ray laser source 211 is correctly focused on the data layer of the disk 10.

Figure 2B:
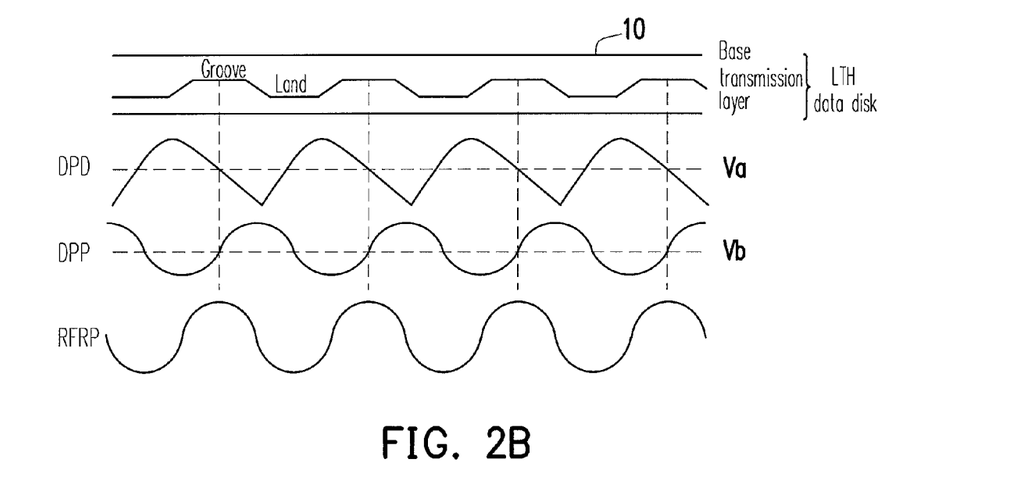
FIG. 2B shows a schematic structure of the LTH data disk in FIG. 2A and schematic signal waveforms thereof.
Figure 2C:
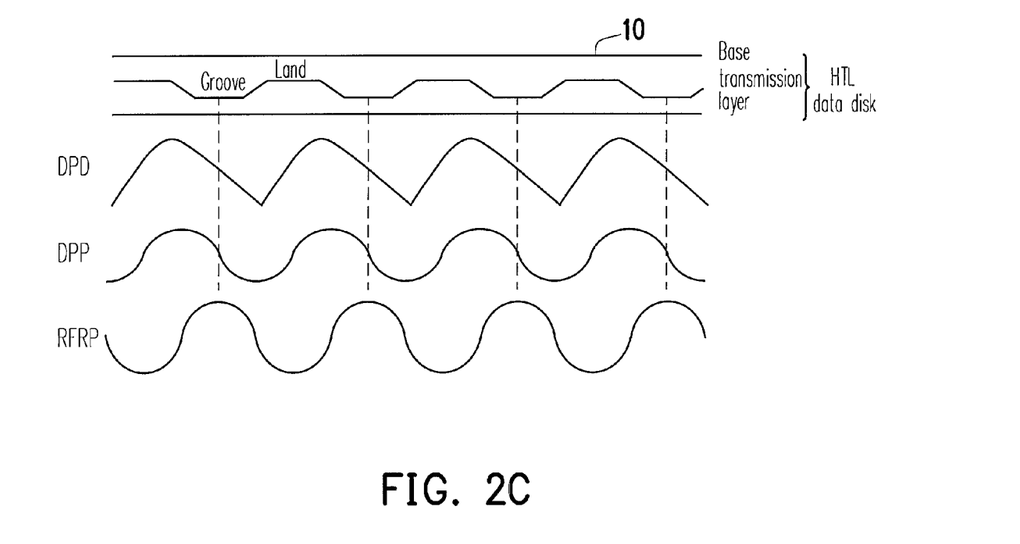
FIG. 2C shows a schematic structure of the HTL data disk in FIG. 2A and schematic signal waveforms thereof.

When the disk 10 is written with data, after the light beam emitted from the optical storage apparatus 200 is focused on the disk 10, the disk 10 is read, so that the DPD signal, the DPP signal, and the RFRP signal are generated. When the disk 10 is the LTH data disk, the phase difference of the DPD signal and the DPP signal generated from the digital signal processor 220 is substantially 180 degrees. That is, the DPD signal is opposite to the DPP signal as signal waveforms shown in FIG. 2B. FIG. 2B shows a schematic structure of the LTH data disk in FIG. 2A and schematic signal waveforms thereof. When the disk 10 is the HTL data disk, the phase difference of the DPD signal and the DPP signal generated from the digital signal processor 220 is substantially 0 degrees. That is, the DPD signal is in-phase to the DPP signal as signal waveforms shown in FIG. 2C. FIG. 2C shows a schematic structure of the HTL data disk in FIG. 2A and schematic signal waveforms thereof.

Referring to FIG. 2B and FIG. 2C, regions for writing data are called "groove", and regions not for writing data are called "land". For the LTH data disk and the HTL data disk, the groove positions for writing the LTH data disk are near to the optical pick-up head, but the groove positions for writing the HTL data disk are distant from the optical pick-up head. Accordingly, since the groove definitions for data writing are different, the signal slopes of the DPP signals of the LTH data disk and the HTL data disk are opposite, but the signal slopes of the DPD signals of the LTH data disk and the HTL data disk are the same because the signal slopes of the DPP signals are only related to the positions for data writing. As a result, the phase difference of the DPD signal and the DPP signal of the HTL data signal is the same, but the phase difference of the DPD signal and the DPP signal of the LTH data signal is opposite. Therefore, the optical storage apparatus 200 determines that the disk 10 with data is the LTH data disk or the HTL data disk upon the above-described characteristic. After the control unit 230 determines that the disk 10 with data is the LTH data disk or the HTL data disk, the control unit 230 would load the corresponding predetermined setting parameters so as to generate a servo signal corresponding to the type of the disk 10 and change the writing strategy (i.e. the control rule).

It should be noted that, the DPP signal is generally obtained by subtracting a sub-push-pull (SPP) signal from a main push-pull (MPP) signal. As a result, the phase of the DPP signal is the same as the phase of the MPP signal but opposite to the phase of the SPP signal. In other embodiments, it is provided to determine the type of the disk 10 by comparing the phase difference of the DPD signal and the MPP signal or the SPP signal. It will be described in the following.

When the disk 10 is an blank disk (i.e. there is no data written in the disk 10), the digital signal processor 220 does not effectively generate the DPD signal. Accordingly, while reading the disk 10, the optical storage apparatus 200 at least generates the DPP signal, the RF signal, and the RFRP signal. Furthermore, since the reflectivity of the LTH blank disk is higher than the reflectivity of the HTL blank disk, the signal intensity outputted from the LTH blank disk is also stronger than the signal intensity outputted from the HTL blank disk. The definition of the reflectivity of the LTH blank disk is 16-35%, and the definition of the reflectivity of the HTL blank disk is 11-24%. Herein, the signal intensity refers to the intensity of the RF signal or the intensity of the RFRP signal.

Figure 2D:
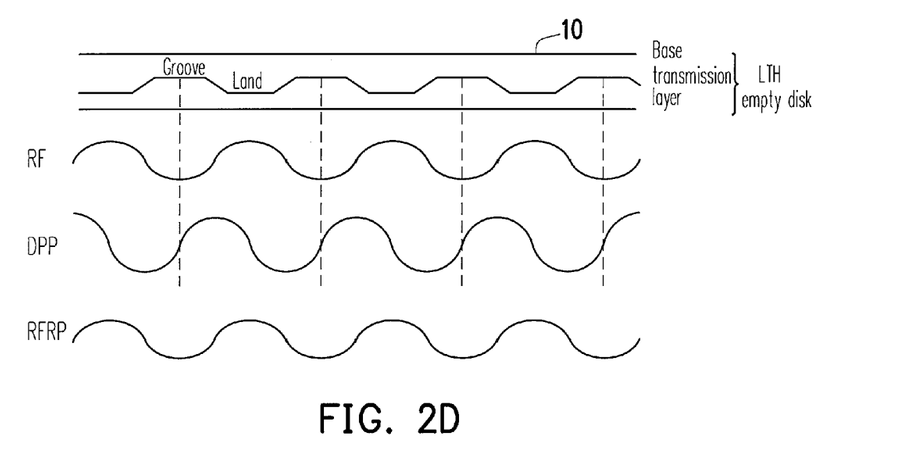
FIG. 2D shows a schematic structure of the LTH blank disk in FIG. 2A and schematic signal waveforms thereof.
Figure 2E:
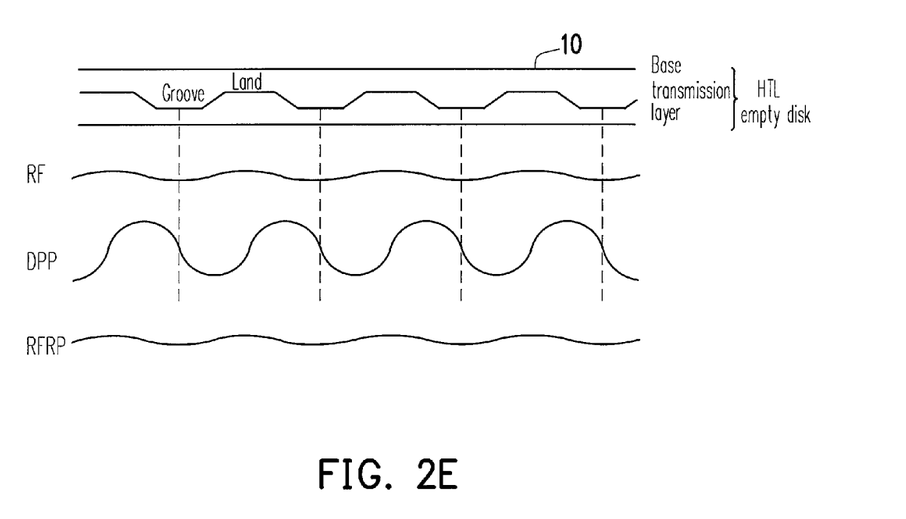
FIG. 2E shows a schematic structure of the HTL blank disk in FIG. 2A and schematic signal waveforms thereof.

FIG. 2D shows a schematic structure of the LTH blank disk in FIG. 2A and schematic signal waveforms thereof. FIG. 2E shows a schematic structure of the HTL blank disk in FIG. 2A and schematic signal waveforms thereof. Referring to FIG. 2D and FIG. 2E, as shown in FIG. 2D and FIG. 2E, the amplitudes of the RF signal and the RFRP signal generated by reading the LTH blank disk are larger than the amplitudes of the RF signal and the RFRP signal generated by reading the HTL blank disk. Accordingly, the optical storage apparatus 200 determines a middle value of the amplitudes of the RF signal and the RFRP signal as the predetermined threshold. Moreover, the optical storage apparatus 200 detects whether a variation of the RF signal and the RFRP signal is larger than the predetermined threshold, and further determines that the disk 10 is the LTH blank disk or the HTL blank disk. Similarly, after the control unit 230 determines that the disk 10 is the LTH blank disk or the HTL blank disk, the control unit 230 would load in corresponding predetermined parameters so as to generate a servo signal corresponding to the type of the disk 10 and change the writing strategy (i.e. the control rule).

Figure 3A:
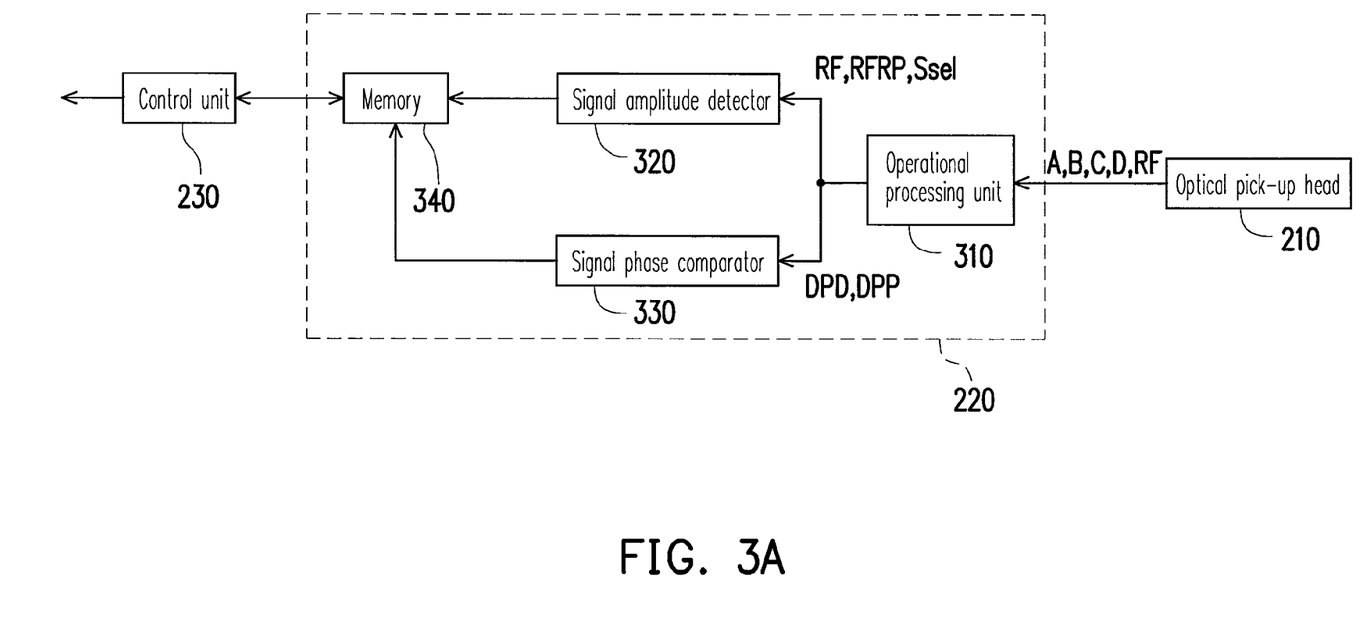
FIG. 3A shows a schematic system of the digital signal processor 220 in FIG. 2A.

FIG. 3A shows a schematic system of the digital signal processor 220 in FIG. 2A. Referring to FIG. 3A, the digital signal processor 220 includes an operational processing unit 310, a signal amplitude detector 320, a signal phase comparator 330, and a memory 340. The operational processing unit 310 is coupled to the optical pick-up head 210, and used for performing an operation according to the electrical signals A, B, C, and D and the RF signal to obtain the DPP signal, the DPD signal, and the RFRP signal. The signal amplitude detector 320 is coupled to the operational processing unit 310 and is used to detect the amplitude of the RF signal or the amplitude of the RFRP signal, and then outputs the detected amplitude.

The signal phase comparator 330 is coupled to the operational processing unit 310, and is used to compare the phase of the DPD signal with the phase of the DPP signal, and then outputs the comparing result. The memory 340 is coupled to the signal amplitude detector 320 and the signal phase comparator 330 and used to store the above-described predetermined threshold, the detected amplitudes of the RF signal and the RFRP signal, the comparing result of the DPD signal and the DPP signal, and the reading or writing parameters corresponding to all of the types of the disk. The control unit 230 reads data from the memory 340 to determine the type of the disk, so as to load in corresponding parameters to generate the servo signal. In other embodiments, the signal phase comparator 330 also compares the phase of the DPD signal with the phase of the MPP signal or the phase of the SPP signal. Similarly, the memory 340 stores the comparing result, and then, the stored comparing result is compared with the predetermined threshold in the control unit 230. Accordingly, the control unit 230 determines that the disk is the LTH disk or the HTL disk and further generates the corresponding servo signal.

Moreover, the signal amplitude detector 320 and the signal phase comparator 330 may be realized with a practical circuit, and thus the process speed of the digital signal processor 220 is not reduced. In other embodiments, the signal amplitude detector 320 and the signal phase comparator 330 may be programmed as a program, so as to be written in the firmware of the digital signal processor 220. Accordingly, the functions of the signal amplitude detector 320 and the signal phase comparator 330 are provided without changing the hardware design in the embodiment of the present invention.

Figure 3B:
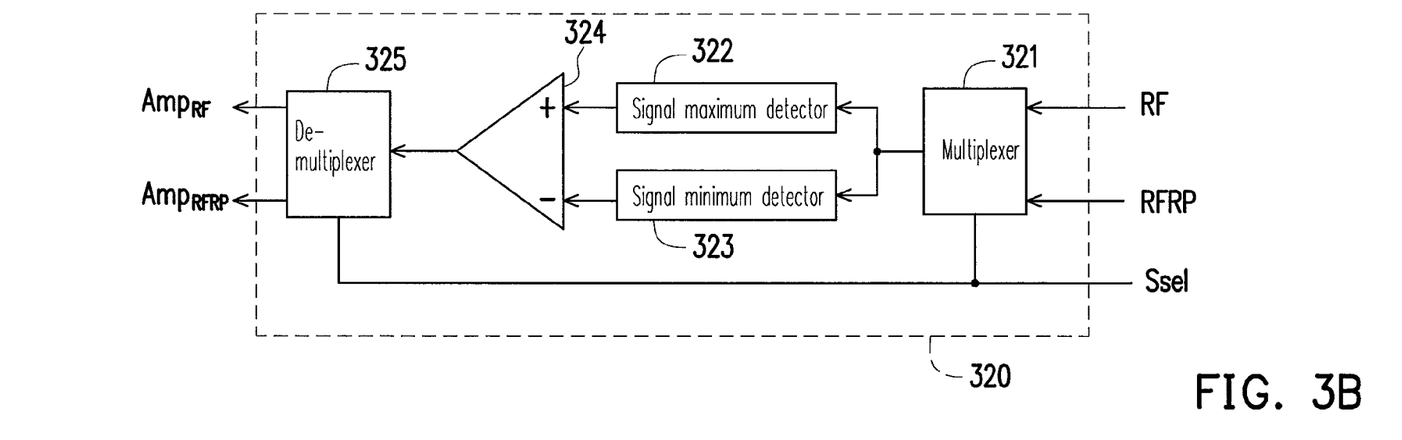
FIG. 3B shows a schematic system of the signal amplitude detector 320 in FIG. 3A.

Next, the signal amplitude detector 320 will be described with a circuit in the following. FIG. 3B shows a schematic system of the signal amplitude detector 320 in FIG. 3A. Referring to FIG. 3B, the signal amplitude detector 320 includes a multiplexer 321, a signal maximum detector 322, a signal minimum detector 323, a subtractor 324, and a de-multiplexer 325. The multiplexer 321 receives the RF signal, the RFRP signal, and a selection signal Ssel and outputs the RF signal or the RFRP signal according to the selection signal Ssel, wherein the selection signal Ssel may be generated by the operational processing unit 310. The signal maximum detector 322 is coupled to the multiplexer 321 and used to detect maxima of the received signals. The signal minimum detector 323 is coupled to the multiplexer 321 and used to detect minima of the received signals. The subtractor 324 having a positive input end coupled to the signal maximum detector 322 and a negative input end coupled to the signal minimum detector 323 to obtain and output a difference of an output signal of the signal maximum detector 322 and an output signal of the signal minimum detector 323. The de-multiplexer 325 is coupled to an output end of the subtractor 324, so as to determine the outputted difference as the amplitude $Amp_{RF}$ of the RF signal or the amplitude $Amp_{RFRP}$ of the RFRP signal upon the selection signal Ssel.

For example, when the selection signal Ssel is a logic high voltage level, the multiplexer 321 outputs the RF signal. The signal maximum detector 322 and the signal minimum detector 323 respectively record the maximum and the minimum of the RF signal. Next, the subtractor 324 subtracts the minimum of the RF signal from the maximum thereof, and the outputted difference is the amplitude $Amp_{RF}$ of the RF signal. As a result, the de-multiplexer 325 outputs the amplitude $Amp_{RF}$ of the RF signal to the corresponding output end according to the selection signal Ssel. On the contrary, when the selection signal Ssel is a logic low voltage level, the multiplexer 321 outputs the RFRP signal, and then, the de-multiplexer 325 outputs the amplitude $Amp_{RFRP}$ of the RFRP signal to the corresponding output end. The circuit operation is similar to the above description, and it will not be described again herein.

Figure 3C:
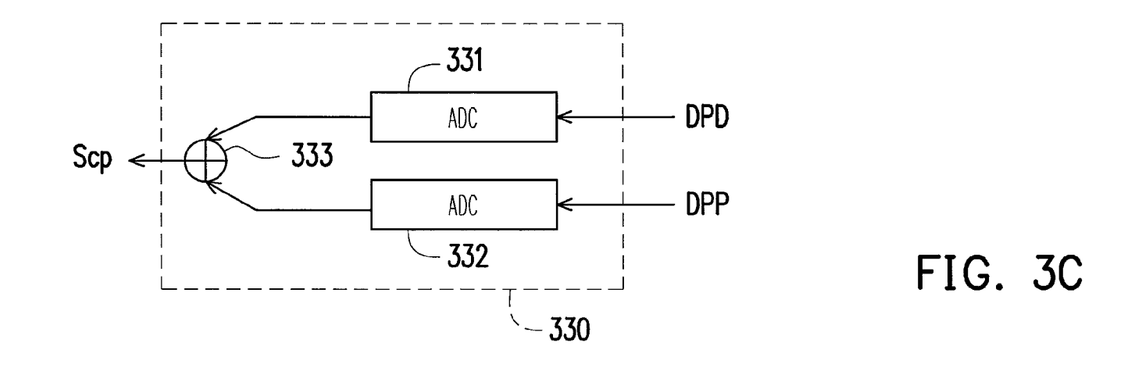
FIG. 3C shows a schematic system of the signal phase comparator 330 in FIG. 3A.

Next, the signal phase comparator 330 will be described in the following. FIG. 3C shows a schematic system of the signal phase comparator 330 in FIG. 3A. Referring to FIG. 3C, the signal phase comparator 330 includes a first analog to digital converter (ADC) 331, a second ADC 332, and a logic operation unit 333. The first ADC 331 receives the DPD signal and outputs the logic voltage level thereof according to the logic voltage level of the DPD signal. The second ADC 332 receives the DPP signal and outputs the logic voltage level thereof according to the logic voltage level of the DPP signal. The logic operation unit 333 outputs a logic voltage level of a compared result $S_{CP}$ related to the phases according to the logic voltage levels of output signals of the first ADC 331 and the second ADC 332. The logic operation unit 333 is, for example, an XOR gate, but not limited thereto.

Referring to the DPD signal and the DPP signal shown in FIG. 2B, in the first ADC 331, when the voltage level of the DPD signal is higher than a voltage Va, the first ADC 331 outputs a logic high voltage level. On the contrary, when the voltage level of the DPD signal is smaller than the voltage Va, the first ADC 331 outputs a logic low voltage level. In the second ADC 332, when the voltage level of the DPP signal is higher than a voltage Vb, the second ADC 332 outputs a logic high voltage level. On the contrary, when the voltage level of the DPP signal is smaller than the voltage Vb, the second ADC 332 outputs a logic low voltage level.

Since the phases of the DPD signal and the DPP signal shown in FIG. 2B are opposite, the outputted logic voltage level from the first ADC 331 and the second ADC 332 are also opposite. Accordingly, when the compared result $S_{CP}$ related to the phases outputted from the logic operation unit 333 is the logic high voltage level, it means that the DPD signal is opposite to the DPP signal. Similarly, since the phases of the DPD signal and the DPP signal are the same (or in-phase), the outputted logic voltage level from the first ADC 331 and the second ADC 332 are also the same. Accordingly, when the compared result $S_{CP}$ related to the phases outputted from the logic operation unit 333 is the logic low voltage level, it means that the DPD signal is in-phase to the DPP signal. However, it should be noted that the above-described voltage levels are exemplary but not to limit the scope of the present invention.

Figure 4:
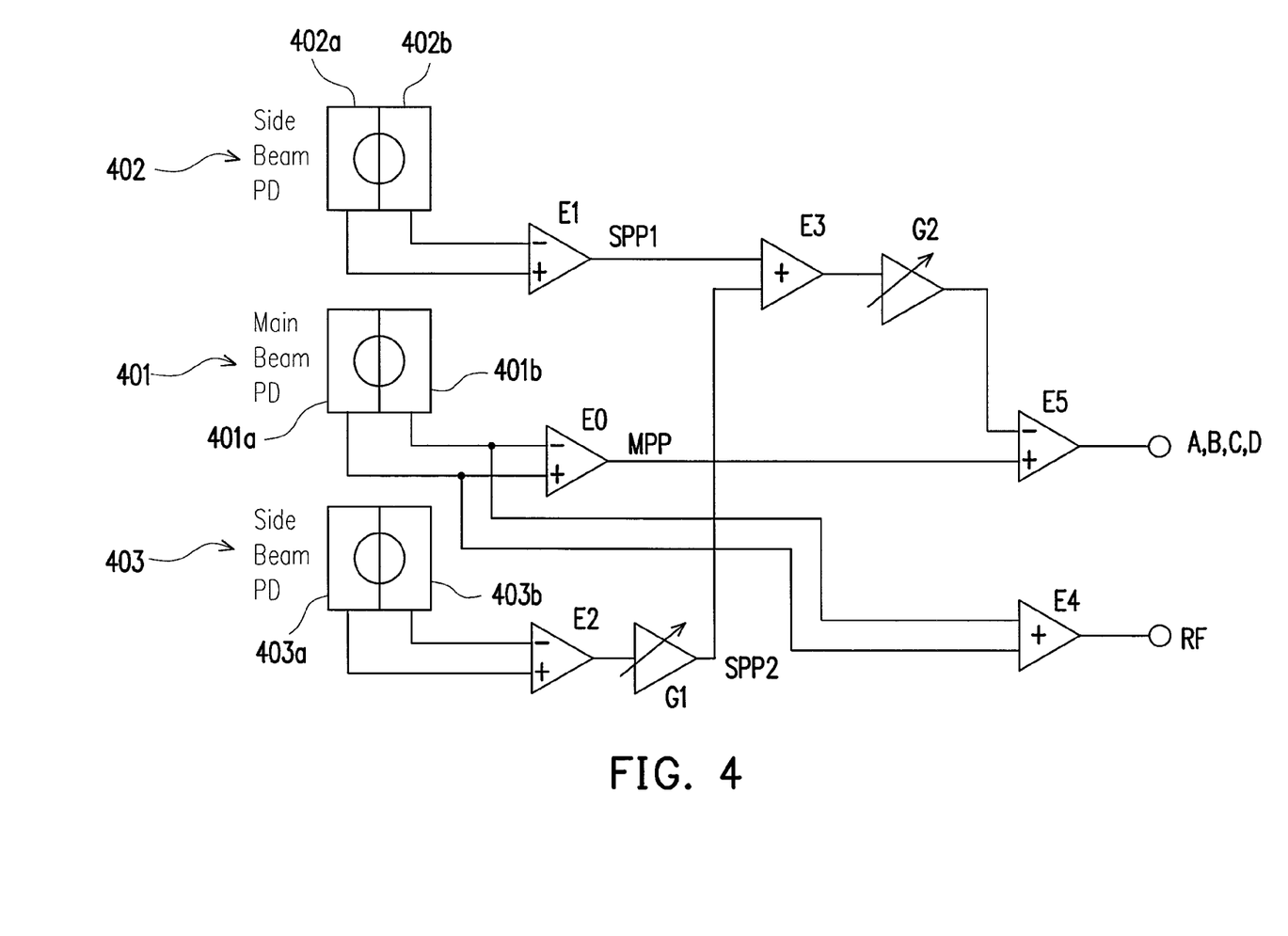
FIG. 4 shows a schematic system of the photo detector 214 in FIG. 2A.

In the optical storage apparatus 200, the phase difference relationship of the DPD signal and the DPP signal may be different from the above-described phase difference relationship according to a photo detector integrated chip (PDIC) of the optical pick-up head 210. FIG. 4 shows a schematic system of the photo detector 214 in FIG. 2A. According to one embodiment of the present invention, the MPP signal is generated by subtracting a light beam signal received by a right half 401b of a main beam photo detector (PD) 401 from a light beam signal received by a left half 401a thereof through a subtractor E0. That is, a positive input end of the subtractor E0 is coupled to the left half 401a of the main beam PD 401, and a negative input end of the subtractor E0 is coupled to the right half 401b thereof.

Meanwhile, when the disk 10 is the LTH data disk, the waveform of the MPP signal thereof is similar to the waveform of the DPP signal shown in FIG. 2B, and the phase of the MPP signal is opposite to the phase of the DPD signal. When the disk 10 is the HTL data disk, the waveform of the MPP signal thereof is similar to the waveform of the DPP signal shown in FIG. 2C, and the phase of the MPP signal is the same as the phase of the DPD signal. Moreover, since a SPP1 signal and a SPP2 signal are generated by subtracting the DPP signal from the MPP signal, the waveforms of the SPP1 signal and the SPP2 signal are opposite to the waveforms of the DPP signal, as shown in figures. That is, the type of the disk 10 is determined upon the SPP1 signal and the SPP2 signal. The amplifiers G1 and G2 are used to regulate the amplitudes of the signals.

According to another embodiment of the present invention, when the directions of the signals respectively received by the main beam PD 401 and side beam PDs 402 and 403 change, the MPP signal, the SPP1 signal, and the SPP2 signal are generated by subtracting the light beam signals received by the corresponding left half thereof from the light beam signals received by the corresponding right half thereof respectively through the subtractors E0, E1, and E2. That is, the positive input end of each of the subtractors E0, E1, and E2 is coupled to the right half of the corresponding PD, and the negative input end of each of the subtractors E0, E1, and E2 is coupled to the left half of the corresponding PD. Accordingly, the waveforms of the signals generated by the PDs 401, 402, and 403 are respectively opposite to the above-described waveforms. Meanwhile, when the disk 10 is the LTH data disk, the phases of the MPP signal and the DPP signal are the same as the phase of the DPD signal, and the phases of the SPP1 signal and the SPP2 signal are opposite to the phase of the DPD signal. When the disk 10 is the HTL data disk, the phases of the MPP signal and the DPP signal are opposite to the phase of the DPD signal, and the phases of the SPP1 signal and the SPP2 signal are the same as the phase of the DPD signal. Accordingly, by comparing the phase of the MPP signal, the SPP1 signal or the SPP2 signal with the phase of the DPD signal, it is determined upon the type of the disk and the phase relationship of the MPP signal, the SPP1 signal or the SPP2 signal and the DPD signal thereof that the disk 10 is the LTH data disk or the HTL data disk. After the signals are processed by the circuit shown in FIG. 4, the electrical signals A, B, C, and D and the RF signal are provided. It is well-known from FIG. 4, so as to be not described herein.

It is described in FIG. 4 that the phases of the MPP signal, the SPP1 signal, and the SPP2 signal are different due to the circuits, from which they are generated, so that the phase relationships of the DPP signal and the DPD signal are different. However, it does not limit the circuits to which the embodiments of the present invention are applied. Nevertheless, when the LTH data disk or the HTL data disk is read, the phase relationship of the DPP signal, the MPP signal, or the SPP signal and the DPD signal are opposite to each other. Accordingly, the type of the disk is determined. Furthermore, while the optical pick-up head is the same, upon the phase difference, which of the first signal, such as the DPD signal, and the second signal, such as the DPP signal, the MPP signal, or the SPP signal, is substantially zero degree or 180 degrees, it is determined that the disk is the LTH disk or the HTL disk. According to one embodiment of the present invention, when the phase difference of the DPD signal and the DPP signal is substantially zero degree, the disk is determined as the LTH data disk, and when the phase difference of the DPD signal and the DPP signal is substantially 180 degrees, the disk is determined as the HTL data disk. Similarly, while the optical pick-up head is the same as the above one, since the SPP signal and the DPP signal are opposite, when the phase difference of the SPP signal and the DPP signal is substantially zero degree, the disk is determined as the HTL data disk. When the phase difference of the SPP signal and the DPP signal is substantially 180 degrees, the disk is determined as the LTH data disk. When a different optical pick-up head is used, since the elements of the PDIC thereof are correspondingly arranged, the result of the relation of the phase difference and the type of the disk may be exactly contrary to the above-described relation. However, upon the phase difference which is substantially zero degree or 180 degrees, it is determined that the disk is the LTH disk or the HTL disk.

Figure 5:
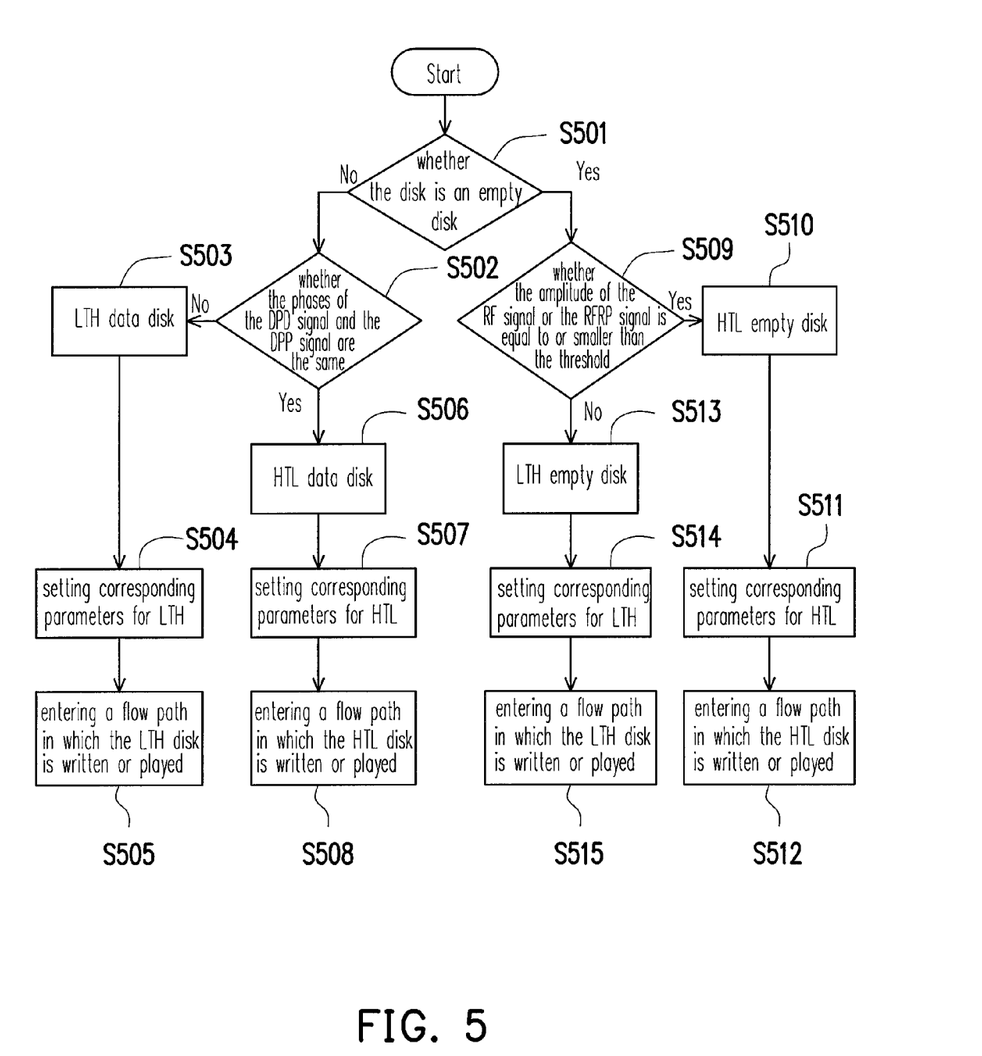
FIG. 5 is a flowchart illustrating a method of determining a type of an optical disk according to one of the embodiments of the present invention.

Next, a method determining a type of an optical disk is summarized according to the above-described embodiments. It will be described in the following. FIG. 5 is a flowchart illustrating a method of determining a type of an optical disk according to one of the embodiments of the present invention. Referring to FIG. 5, first, a disk placed in the optical storage apparatus is determined whether the disk is a blank disk or not in step S501. It should be noted that by detecting the RF signal and/or the DPD signal to determine whether the disk is the blank disk or not. It is well-known by those skilled in the art, so that detailed description thereof will not be described herein. When the disk is not the blank disk, a step S502 is performed. That is a result determined in step S501 is "NO". It is determined whether the phases of the DPD signal and the DPP signal are the same or not in step S502. When the phases of the DPD signal and the DPP signal are not the same, it means that the disk is the LTH data disk, as shown in step S503. That is, a result determined in step S502 is "NO". Next, a step S504 is performed. Reading and writing parameters related to the LTH disk are loaded in the optical storage apparatus, so that the related parameters related to the LTH disk are set in step S504. Thereafter, as shown in step S505, the optical storage apparatus is set to a flow path in which the LTH disk is written or played.

Returning to the step S502, when the phases of the DPD signal and the DPP signal are the same, it means that the disk is the HTL data disk, as shown in step S506. That is, a result determined in step S502 is "YES". Next, a step S507 is performed. Reading and writing parameters related to the HTL disk are loaded in the optical storage apparatus, so that the related parameters related to the HTL disk are set in step S507. Thereafter, as shown in step S508, the optical storage apparatus is set to a flow path in which the HTL disk is written or played.

Returning to the step S501, when the disk is the blank disk, a step S509 is performed. That is a result determined in step S501 is "YES". It is determined whether the amplitude of the RF signal or the RFRP signal is smaller than or equal to a predetermined threshold or not in step S509. When the amplitude of the RF signal or the RFRP signal is smaller than the predetermined threshold, it means that the disk is the HTL blank disk, as shown in step S510. That is, a result determined in step S509 is "YES". Next, a step S511 is performed. The reading and writing parameters related to the HTL disk are loaded in the optical storage apparatus, so that the related parameters related to the HTL disk are set in step S511. Thereafter, as shown in step S512, the optical storage apparatus is set to a flow path in which the HTL disk is written or played.

Returning to step S509, when the amplitude of the RF signal or the RFRP signal is larger than the predetermined threshold, it means that the disk is the LTH blank disk, as shown in step S513. That is, a result determined in step S509 is "NO"

Next, a step S514 is performed. the reading and writing parameters related to the LTH disk are loaded in the optical storage apparatus, so that the related parameters related to the LTH disk are set in step S514. Thereafter, as shown in step S515, the optical storage apparatus is set to a flow path in which the LTH disk is written or played.

In step S501, before tracking the disk, the optical storage apparatus first read the disk. When the DPD signal or the RF signal is not generated in the read result, it is determined that the disk is the blank disk. Otherwise, it is determined that the disk is not the blank disk. Furthermore, the type of the disk may also be determined upon the MPP signal or the SPP signal, rather than being determined upon the DPP signal.

It should be noted that, in other embodiments, the phases of the DPD signal and the DPP signal may change due to the design of the photo detector, so that the result determined in step S502 also changes. That is, when the phases of the DPD signal and the DPP signal are the same, it means that the disk is the LTH data disk. Otherwise, the disk is the HTL data disk. The flowchart shown in FIG. 5 is an exemplary embodiment but not limits the scope of the present invention.

To sum up, an optical storage apparatus and a method determining a type of an optical disk thereof is provided in the embodiments of the present invention. When the disk is the data click, it is determined that the data disk is the LTH data disk or the HTL data disk upon the phase difference of the DPD signal and the DPP signal. When the disk is the blank click, it is determined that the blank disk is the LTH blank disk or the HTL blank disk upon whether the amplitudes of the RF signal and the RFRP signal are larger than the predetermined threshold or not. Next, the predetermined parameters corresponding to the different types of the disks are loaded, so that the control unit generates a corresponding servo signal. Accordingly, the optical storage apparatus correctly tracks. Therefore, the disk can be played and written due to the parameters correctly loaded in the optical storage apparatus.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A method for determining a type of a disk, comprising:
   determining whether the disk is a blank disk or not;
   detecting phases of a first signal and a second signal of the disk when the disk is not the blank disk; and
   determining that the disk is a low to high (LTH) data disk or a high to low (HTL) data disk upon whether the phases of the first signal and the second signal are the same or not.

2. The method as claimed in claim 1, further comprising:
   detecting an amplitude of a third signal and/or an amplitude of a fourth signal of the disk when the disk is the blank disk; and
   determining that the disk is an LTH blank disk or an HTL blank disk upon whether the amplitude of the third signal and/or the amplitude of the fourth signal are/is larger than a predetermined threshold or not.

3. The method as claimed in claim 2, wherein the step of "determining that the disk is the LTH blank disk or the HTL blank disk" comprises:
   when the amplitude of the third signal and/or the amplitude of the fourth signal are/is smaller than or equal to the predetermined threshold, the disk is the HTL blank disk; and
   when the amplitude of the third signal and/or the amplitude of the fourth signal are/is larger than the predetermined threshold, the disk is the LTH blank disk.

4. The method as claimed in claim 3, wherein the third signal is a radio frequency (RF) signal, and the fourth signal is a radio frequency ripple (RFRP) signal.

5. The method as claimed in claim 1, wherein the first signal is a differential phase detection (DPD) signal; and the second signal is a main push-pull (MPP) signal, a sub-push-pull (SPP) signal, a differential push-pull (DPP), or a combination of the above signals.

6. The method as claimed in claim 1, wherein the step of "determining that the disk is the LTH data disk or the HTL data disk" comprises:
   when the phases of the first signal and the second signal are the same, the disk is the HTL data disk; and
   when the phases of the first signal and the second signal are opposite, the disk is the LTH data disk.

7. The method as claimed in claim 1, wherein the step of "determining that the disk is the LTH data disk or the HTL data disk" comprises:
   when the phases of the first signal and the second signal are opposite, the disk is the HTL data disk; and
   when the phases of the first signal and the second signal are the same, the disk is the LTH data disk.

8. The method as claimed in claim 1, wherein the disk is a blu-ray disk.

9. An optical storage apparatus for determining a type of a disk, comprising:
   an optical pick-up head, used to read the disk and outputting a plurality of electrical signals according to a result of reading the disk, wherein the electrical signals comprise an RF signal;
   a digital signal processor, coupled to the optical pick-up head, processing the electrical signals as a first signal, a second signal, and an RFRP signal, and detecting phases of the first signal and the second signal; and
   a control unit, coupled to the digital signal processor, wherein when the disk is not a blank disk, the control unit determines that the disk is an LTH data disk or an HTL data disk upon whether the phases of the first signal and the second signal are the same or not, and loads in a plurality of corresponding parameters according to a result of determining that the disk is the LTH data disk or the HTL data disk, so as to generate a corresponding servo signal.

10. The optical storage apparatus as claimed in claim 9, wherein when the disk is the blank disk, the digital signal processor detects an amplitude of an RF signal and/or an amplitude of an RFRP signal, and the control unit determines that the disk is an LTH blank disk or an HTL blank disk upon whether the amplitudes of the signals are larger than a predetermined threshold or not.

11. The optical storage apparatus as claimed in claim 10, wherein the digital signal processor comprises:
   an operational processing unit coupled to the optical pick-up head and used to proceed an operation according to the electrical signals to generate the first signal, the second signal, and the RFRP signal;
   a signal amplitude detector, coupled to the operational processing unit and used to detect the amplitude of the RF signal or the amplitude of the RFRP signal;
   a signal phase comparator, coupled to the operational processing unit and used to compare the phase of the first signal with the phase of the second signal; and
   a memory, coupled to the signal amplitude detector and the signal phase comparator and used to store the predetermined threshold, the amplitudes of the RF signal and the RFRP signal, and a result of comparing the phase of the first signal with the phase of the second signal.

12. The optical storage apparatus as claimed in claim 11, wherein the signal amplitude detector comprises:
   a multiplexer, receiving the RF signal, the RFRP signal, and a selection signal and outputting the RF signal or the RFRP signal according to the selection signal;
   a signal maximum detector, coupled to the multiplexer and used to detect maxima of received signals;
   a signal minimum detector, coupled to the multiplexer and used to detect minima of received signals;
   a subtractor, having a positive input end coupled to the signal maximum detector and a negative input end coupled to the signal minimum detector to obtain and output a difference of an output signal of the signal maximum detector and an output signal of the signal minimum detector; and
   a de-multiplexer, coupled to an output end of the subtractor, so as to determine the difference as the amplitude of the RF signal or the amplitude of the RFRP signal upon the selection signal.

13. The optical storage apparatus as claimed in claim 11, wherein the signal amplitude detector comprises:
   a first analog to digital converter (ADC), receiving the first signal;
   a second ADC, receiving the second signal; and
   a logic operation unit, coupled to the first ADC and the second ADC, used to generate the result of comparing the phase of the first signal with the phase of the second signal according to output signals of the first ADC and the second ADC.

14. The optical storage apparatus as claimed in claim 11, wherein the first signal is a DPD signal; and the second signal is an MPP signal, an SPP signal, a DPP signal, or a combination of the three signals.

15. The optical storage apparatus as claimed in claim 11, wherein the disk is a blu-ray disk.

16. A method for determining a type of a disk, comprising:
   determining whether the disk is a blank disk or not;
   detecting a phase difference of a first signal and a second signal of the disk when the disk is not the blank disk; and determining that the disk is a low to high (LTH) data disk or a high to low (HTL) data disk upon the phase difference of the first signal and the second signal.

17. The method as claimed in claim 16, wherein when the phase difference of the first signal and the second signal is substantially zero degree, determining that the disk is the LTH data disk, and when the phase difference of the first signal and the second signal is substantially 180 degrees, determining that the disk is the HTL data disk.

18. The method as claimed in claim 16, wherein when the phase difference of the first signal and the second signal is substantially zero degree, determining that the disk is the HTL data disk, and when the phase difference of the first signal and the second signal is substantially 180 degrees, determining that the disk is the LTH data disk.

19. The method as claimed in claim 16, wherein the first signal is a DPD signal, and the second signal is a MPP signal, a SPP signal, a DPP signal, or a combination signal of the three signals.

20. The method as claimed in claim 16, further comprising:

detecting whether an amplitude of a third signal and/or an amplitude of a fourth signal of the disk are/is larger than a predetermined threshold when the disk is the blank disk or not;

when the amplitude of the third signal and/or the amplitude of the fourth signal are/is smaller than or equal to the predetermined threshold, the disk is the HTL blank disk; and when the amplitude of the third signal and/or the amplitude of the fourth signal are/is larger than the predetermined threshold, the disk is the LTH blank disk.

21. The method as claimed in claim 16, wherein the third signal is an RF signal, and the fourth signal is an RFRP signal.

* * * * *